(12) United States Patent
Cheney

(10) Patent No.: US 7,681,767 B2
(45) Date of Patent: *Mar. 23, 2010

(54) VEHICLE STORAGE BOX WITH CLOSURE SYSTEM

(75) Inventor: Dale S. Cheney, 2679 W. 1700 South, Syracuse, UT (US) 84075

(73) Assignee: Dale S. Cheney, Park City, UT (US)

( * ) Notice: Subject to any disclaimer, the term of this patent is extended or adjusted under 35 U.S.C. 154(b) by 2112 days.

This patent is subject to a terminal disclaimer.

(21) Appl. No.: 10/021,267

(22) Filed: Oct. 29, 2001

(65) Prior Publication Data

US 2002/0113106 A1 Aug. 22, 2002

Related U.S. Application Data

(62) Division of application No. 09/465,507, filed on Dec. 16, 1999, now Pat. No. 6,386,409.

(51) Int. Cl.
*B60R 9/00* (2006.01)
(52) U.S. Cl. .......................... 224/404; 292/101; 292/98; 292/103
(58) Field of Classification Search ............... 292/8, 292/103, 98, 101, 102, 24, 25, 26, 27, 126, 292/123, 97, 100, 242; 224/4.5, 404, 403, 224/402; 414/402; 220/324, 323
See application file for complete search history.

(56) References Cited

U.S. PATENT DOCUMENTS

| | | | | |
|---|---|---|---|---|
| 217,146 A | * | 7/1879 | Quackenbush | 292/101 |
| 460,437 A | * | 9/1891 | Grove | 292/247 |
| 532,067 A | * | 1/1895 | Howe | 292/101 |
| 621,318 A | * | 3/1899 | Brachhausen | 292/101 |
| 1,155,447 A | * | 10/1915 | Saunders | 312/35 |
| 1,513,234 A | * | 10/1924 | Fritsch | 292/101 |

(Continued)

*Primary Examiner*—Tri M Mai
(74) *Attorney, Agent, or Firm*—Steven L Nichols

(57) ABSTRACT

The vehicle storage box of the present invention provides significant advantages over conventional vehicle storage boxes. Featured in the present invention is a vehicle storage box that comprises a base structure; a lid, pivotally connected to the base structure, shaped to enclose the base structure; divider means, pivotally connected to the base structure, for dividing the storage box into two compartments for holding articles; divider coupling means, connected to the divider means and the lid, for releasably coupling the divider means to the lid; and lid coupling means, connected to the lid and the base structure, for releasably coupling the lid to the base structure, and having a first coupling position occurring when the lid is in an opened position. The lid coupling means also comprises a first and second lid actuator and a first and second lid latch wherein the first and second lid actuators are coupled together by a lid actuator connector for simultaneous operation of the first and second lid actuators. The divider coupling means further comprises a first and second divider actuator coupled to the lid and a first and second divider latch coupled to the divider means wherein the first and second divider actuators are coupled together by a divider actuator connector for simultaneous operation of the first and second divider actuators. The vehicle storage box according to the present invention also includes a single hinge connecting the base structure, the divider means and the lid, such that the lid and the divider means pivot around the same axis.

23 Claims, 10 Drawing Sheets

U.S. PATENT DOCUMENTS

| | | | |
|---|---|---|---|
| RE16,643 E * | 5/1927 | Luce | 70/71 |
| 1,943,927 A * | 1/1934 | Phillips | 292/241 |
| 2,708,302 A * | 5/1955 | Wilkirson | 27/2 |
| 4,363,226 A * | 12/1982 | Remington et al. | 70/70 |
| 4,531,774 A | 7/1985 | Whatley | |
| 4,809,897 A | 3/1989 | Wright, Jr. | |
| 4,936,624 A | 6/1990 | West | |
| 4,948,181 A * | 8/1990 | Pritchard | 292/28 |
| 4,967,944 A | 11/1990 | Waters | |
| 4,973,092 A * | 11/1990 | Godbe et al. | 292/190 |
| 5,042,853 A * | 8/1991 | Gleason et al. | 292/126 |
| 5,080,250 A | 1/1992 | Dickinson et al. | |
| 5,299,722 A | 4/1994 | Cheney | |
| 5,308,126 A * | 5/1994 | Weger et al. | 292/53 |
| 5,439,150 A | 8/1995 | Trahms | |
| 5,439,151 A | 8/1995 | Clayton | |
| 5,484,092 A | 1/1996 | Cheney | |
| 5,598,961 A | 2/1997 | Sills | |
| 5,601,206 A * | 2/1997 | Haas et al. | 220/324 |
| 5,875,948 A * | 3/1999 | Sadler | 224/404 |
| 5,924,616 A | 7/1999 | Shives | |
| 5,984,383 A * | 11/1999 | Parikh et al. | 292/121 |
| 6,079,585 A * | 6/2000 | Lentini | 224/404 |
| 6,106,034 A * | 8/2000 | Allen | 292/241 |
| 6,276,552 B1 * | 8/2001 | Vervisch | 220/324 |
| 6,349,577 B1 * | 2/2002 | Hansen et al. | 70/159 |
| 6,386,409 B1 * | 5/2002 | Cheney | 224/404 |
| 6,464,423 B1 * | 10/2002 | Klein | 403/322.4 |

\* cited by examiner

VEHICLE STORAGE BOX WITH CLOSURE SYSTEM

This is a division of application Ser. No. 09/465,507, filed Dec. 16, 1999 now U.S. Pat. No. 6,386,409.

FIELD OF THE INVENTION

The present invention relates to utility vehicle storage boxes. Specifically, the storage box has a cam latching design which catches when the lid is open.

BACKGROUND OF THE INVENTION

There is an overstated need in the industry to provide container and box arrangements to store and hold articles in a pickup truck bed. For example, U.S. Pat. No. 4,531,774 to Whatley; U.S. Pat. No. 4,936,624 to West; and U.S. Pat. No. 4,967,944 to Waters, which are incorporated by reference for their supportive teachings, show just a few of the proposed schemes for pickup truck mounted boxes and associated mounting structures. U.S. Pat. No. 5,484,092, to Cheney, is also incorporated by reference.

The theft of valuable articles from vehicles is an ever increasing reality of modern life. Thieves are particularly attracted to certain types of valuable articles. For example, many persons desire to keep sporting good articles, such as rifles, shotguns, and fishing rods, in a vehicle at all times to be ready for immediate use. Such sporting goods are particularly attractive targets for thieves and, due to their elongated size, cannot be effectively hidden (for example by covering with clothing), in a vehicle which does not have a securable trunk space.

The need for providing secure storage in a pickup truck, or other vehicle without a trunk space, is recognized in the art. Even further, U.S. Pat No. 4,809,897 to Wright, also incorporated by reference for its illustrative teachings, provides a lockable storage compartment for use in a vehicle cab; thus recognizing the need for secure storage even inside a locked vehicle compartment.

There are, however, many disadvantages associated with the prior art designs. Disadvantageously, the Wright reference is unusable for storage of elongated, generally flat sporting goods such as rifles and fishing gear. Also, the device disclosed in the Wright reference does not effectively protect articles from damage due to impacts and provides inadequate protection from the weather if it were ever mounted exterior of the vehicle cab.

Additionally, the previously available storage devices provide inadequate security form theft, do not sufficiently protect valuable articles from damage, and/or are inconvenient to use.

Still another disadvantage of conventional vehicle storage boxes lies with the closing and securing of the lid to the main base compartment. To close the lid and secure it, the user must exert all the necessary force needed to lower the lid into its proper position for locking. This can be burdensome when items in the box offer any resistance because the box is too full. There is nothing in the design of conventional boxes to facilitate the closing and securing of the lid to the base compartment when the box is too full.

In view of the forgoing, it would be an advance in the art to provide a vehicle mounted storage box with a secured compartment for holding and protecting valuable sporting goods and other such articles from theft and damage and which is convenient to use. It would also be an advance in the art to provide a vehicle storage box that could be completely opened from either side of the vehicle. It would be yet another advancement in the art to provide a vehicle storage box that facilitates closing and locking of an overfilled box, thus alleviating the need for the user to exert all necessary force needed for closing and securing the lid.

SUMMARY OF THE INVENTION

It has been recognized that it would be advantageous to develop a vehicle storage box with a latch that catches when the lid is still open. In addition, it has been recognized that it would be advantageous to develop a vehicle storage box which facilitates closing and locking of an overfilled box.

The invention provides a vehicle storage box with a lid pivotally connected to a base structure, and a lid coupler with a first coupling position advantageously occurring when the lid is in an opened position. The lid coupler is connected to the lid and the base structure, and shaped to releasably couple the lid to the base structure. The lid coupler includes a lid latch and a lid actuator. The lid actuator advantageously includes a hooking cam to engage the lid latch while the lid is in an opened position. Thus, as the lid actuator is rotated, the lid latch tracks along the hooking cam of the lid actuator while the lid is pulled down.

In accordance with one aspect of the present invention, the base structure is configured to attach to a vehicle, and has a length sized to fit between side walls of a truck bed.

In accordance with another aspect of the present invention, the lid actuator rotates substantially 180 degrees such that the lid latch is forced through cam action motion.

In accordance with another aspect of the present invention, the hooking cam includes a hook, a cam, and a notch. The notch is shaped and positioned to receive and retain the lid actuator when the lid is in a closed and secured position.

In accordance with another aspect of the present invention, the lid coupler includes first and second adjustable lid actuators, and first and second adjustable lid latches. The first and second lid actuators can be coupled together by a lid actuator connector for simultaneous operation of the first and second lid actuators. A cable and pulley system can include a pulley coupled to each of the lid actuators, and connected by a cable.

In accordance with another aspect of the present invention, the first and second lid latches are substantially L-shaped members having a latching point f or engaging respectively the first and second lid actuators.

Additional advantages of the present invention will be apparent from the following detailed description of preferred embodiments thereof, which proceeds with reference to the accompanying drawings.

BRIEF DESCRIPTION OF THE DRAWINGS

These and other features and advantages of the present invention will be better understood by reading the following detailed description, taken together with the drawings, wherein.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. Like numbering between figures represent like elements.

DETAILED DESCRIPTION OF THE PREFERRED EMBODIMENT

Figure 1:
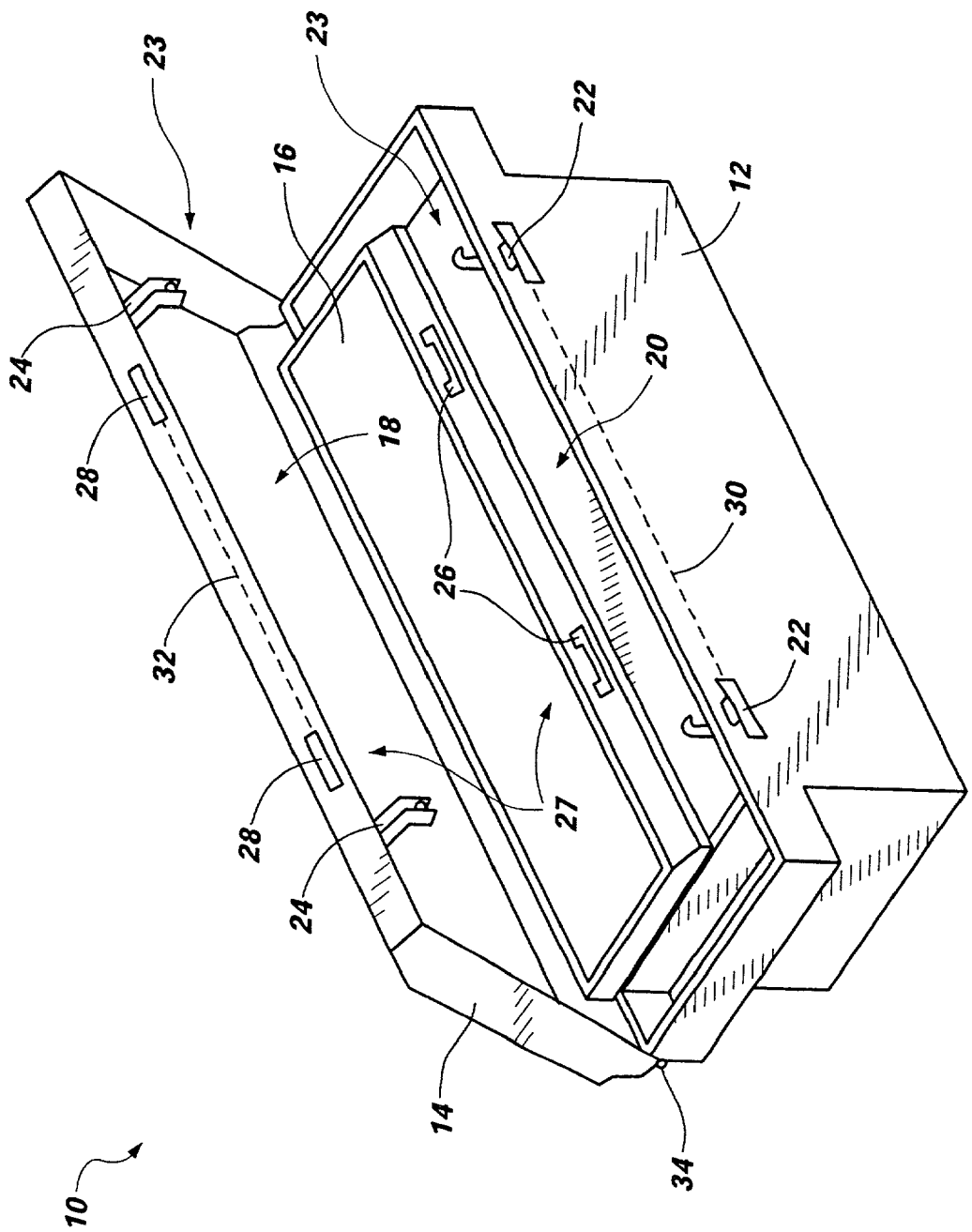
FIG. 1 is an isometric view of one embodiment illustrated in FIG. 1.

In the preferred embodiment shown in FIG. 1, a vehicle storage box 10, according to the present invention, comprises a base structure 12 having a compartment for holding various articles, a lid 14, a divider or divider means 16, a lid coupler or lid coupling means 23, and a divider coupler or divider coupling means 27. Lid 14 and divider 16 are pivotally coupled to the base structure 12 by hinge 34. Thus, lid 14 and divider 16 rotate or pivot about the same axis. In a preferred embodiment hinge 34 is a conventional piano hinge. Hinge 34 will be described in more detail below.

Two compartments exist according to a preferred embodiment of the present invention. The first, or base compartment 20 is defined by the base structure 12 and the bottom surface of divider 16. The second, or top compartment 18 is defined by the bottom surface of lid 14 and the top surface of divider 16.

In addition to the teachings disclosed in U.S. Pat. No. 5,484,092, which is herein incorporated by reference, vehicle storage box 10 has a lid coupler 23 engaging lid 14 while lid 14 is still in an opened position. Lid coupler 23 further has a lid latch or lid latching means 24 and a lid actuator or lid actuating means 22. Additionally, divider coupler 27 is comprised of a divider actuator or divider actuator means 28 and a divider latch or divider latching means 26.

Uniquely, lid coupler 23 has a first and second lid actuator 22. Divider coupler 27 has a first and second divider actuator or divider actuating means 28. First and second lid actuators 22 are connected by a lid actuator connector 30. First and second divider actuators 28 are connected by a divider actuator connector 32. These connectors 32 allow the user of vehicle storage box 10 to open and operate simultaneously, or in a dual manner, first and second lid coupler 23 or divider coupler 27 from one side of vehicle storage box 10. By activating either first or second lid actuator 22 or divider actuator 28, the other is simultaneously activated via connector 32 coupling them together.

Figure 2:
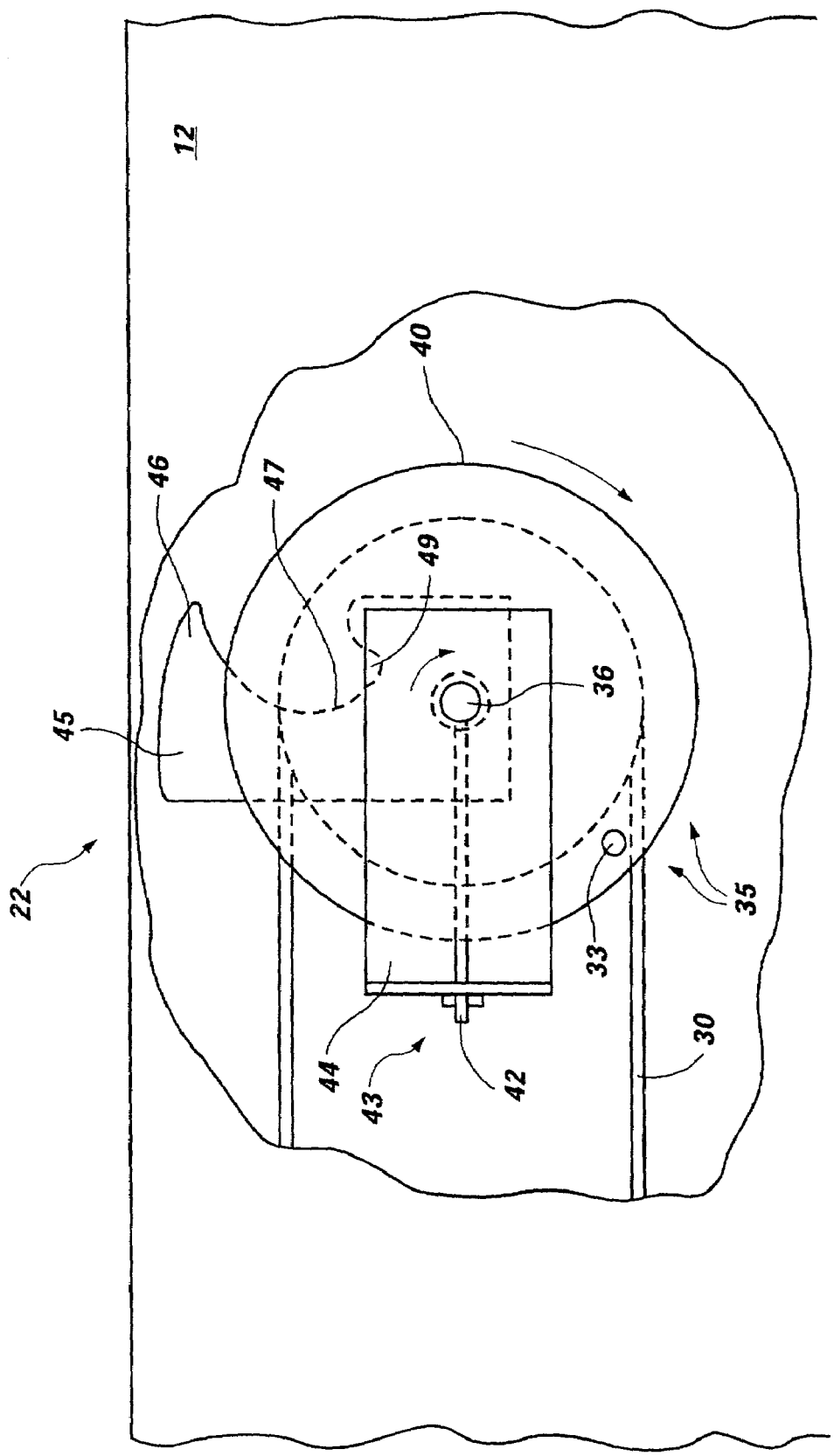
FIG. 2 is a front view of a lid actuator means illustrated in FIG. 1.
Figure 3:
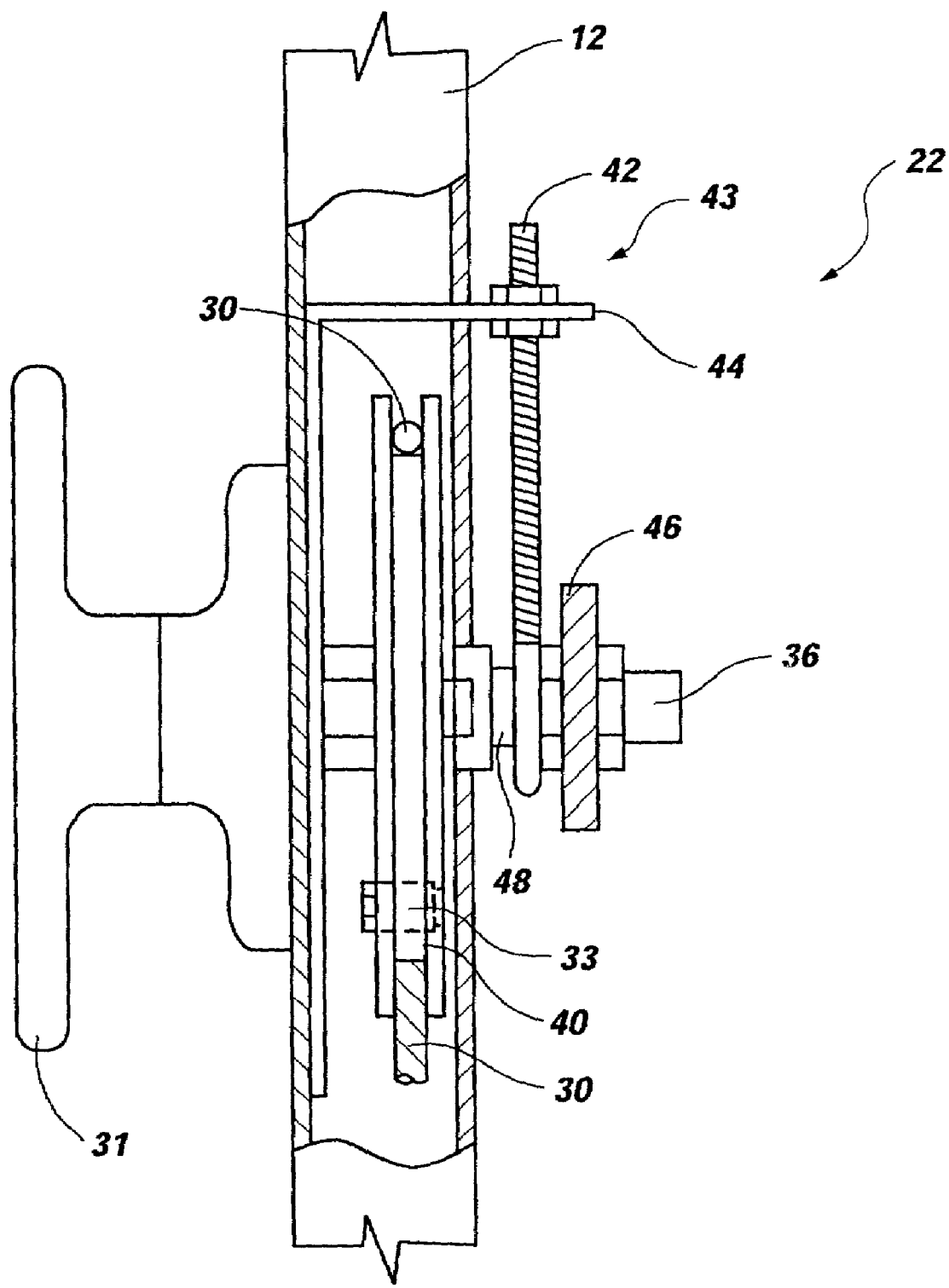
FIG. 3 is a side view of a lid actuator means illustrated in FIG. 1.

Referring to FIGS. 2 and 3, lid actuator 22, has a hooking cam 45 having a hook 46 and a cam 47. Hooking cam 45 is attached to and rotates about bolt 36, which also serves as a coupling member for stabilizing means 43 and pulley 40. Bolt 36 attaches lid actuator 22 to base structure 12, and couples handle 31 to base structure 12. Lid actuator 22 also comprises a lid actuator connector 35, which includes a pulley 40 and a cable 30. Cable 30 connects a lid actuator 22 between a first and second lid actuator 22 for providing simultaneous operation. This allows a user to simultaneously activate both locking mechanisms of the present invention from either side of the vehicle storage box 10. As a user turns handle 31 on one side of vehicle storage box 10, pulley 40 rotates. As either pulley 40 rotates, this causes the other pulley 40 to rotate simultaneously because of cable 30 connected there between. This simultaneous rotation causes the activation of hooking cam 45 located on each of first and second lid actuators 22. Stabilizing means 43 has an eyelet screw 42 and bracket 44. Bracket 44 is attached to base structure 12 and acts as a brace for eyelet screw 42. As appreciated by one skilled in the art, stabilizing means 43 may consist of many different arrangements for supporting lid actuator means 22 and is not necessarily limited to bracket 44 and eyelet screw 42.

This provides a significant advantage over prior art vehicle storage boxes. Typically, to secure and lock a vehicle storage box with a locking mechanism on each side of the box, the user had to activate each mechanism one at a time because each is independent of the other. This would require the user to activate one lock and then walk around to the other side of the vehicle to activate the other lock. The present invention eliminates this hassle by connecting each of its two coupling means 23 and 27 together.

Lid actuator 22 is constructed to rotate substantially 180 degrees about bolt 36. The need to rotate substantially 180 degrees is a function of hooking cam 45. To enable the user to hook lid latch 24 while lid 14 is still in an opened position, and to then rotate lid actuator 22 to its final position wherein lid latch 24 completely tracks withing cam 47 pulling lid 14 to a closed and secured position, lid actuator must rotate substantially 180 degrees. The range of motion hooking can travels from the first coupling position to the final coupling position is substantially 180 degrees. This allows the relationship between lid actuator and hooking cam 45 to function as intended.

Pulley 40 further includes a cable set screw 33 coupled to pulley 40 and engaging cable 30. Cable set screw 33 allows cable 30 to be adjusted and secured in a fixed orientation. Through use, lid actuator 22 may from time to time need adjustment to ensure proper orientation of hooking cam 45. By loosening cable set screw 33, cable 30 can be adjusted so that lid actuator 22 is properly oriented ready to accept and engage lid latch 24.

Figure 4:
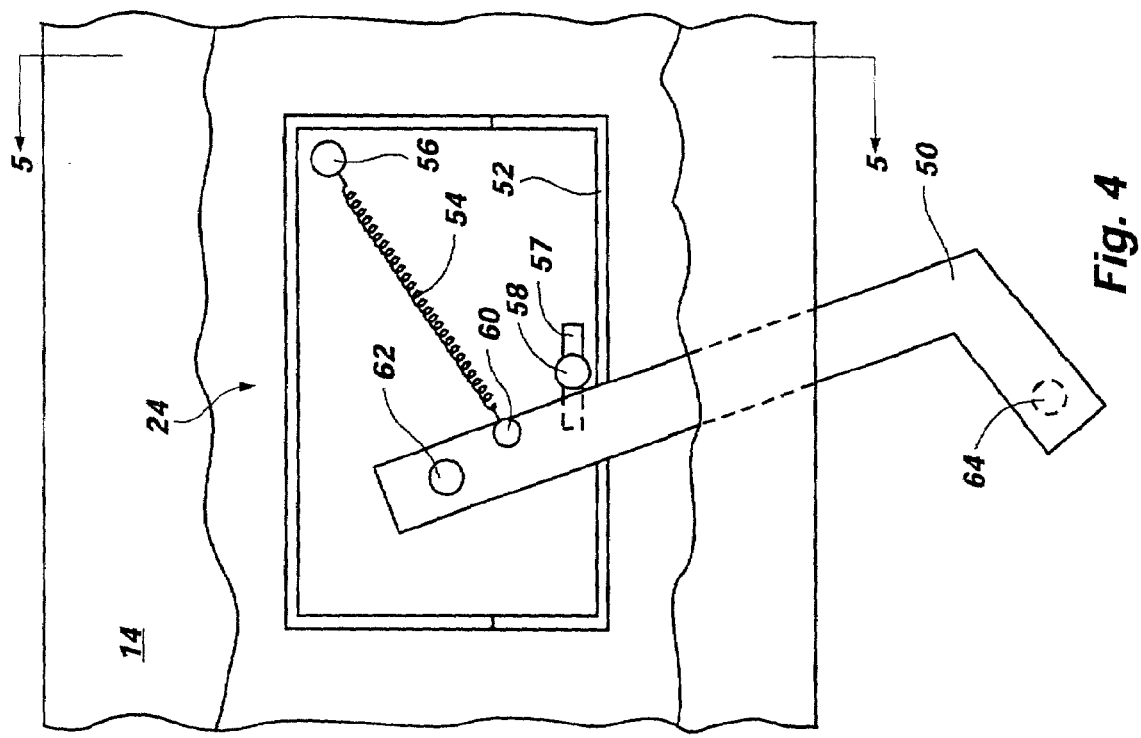
FIG. 4 is a front view of a lid latching means or latch illustrated in FIG. 1.
Figure 5:
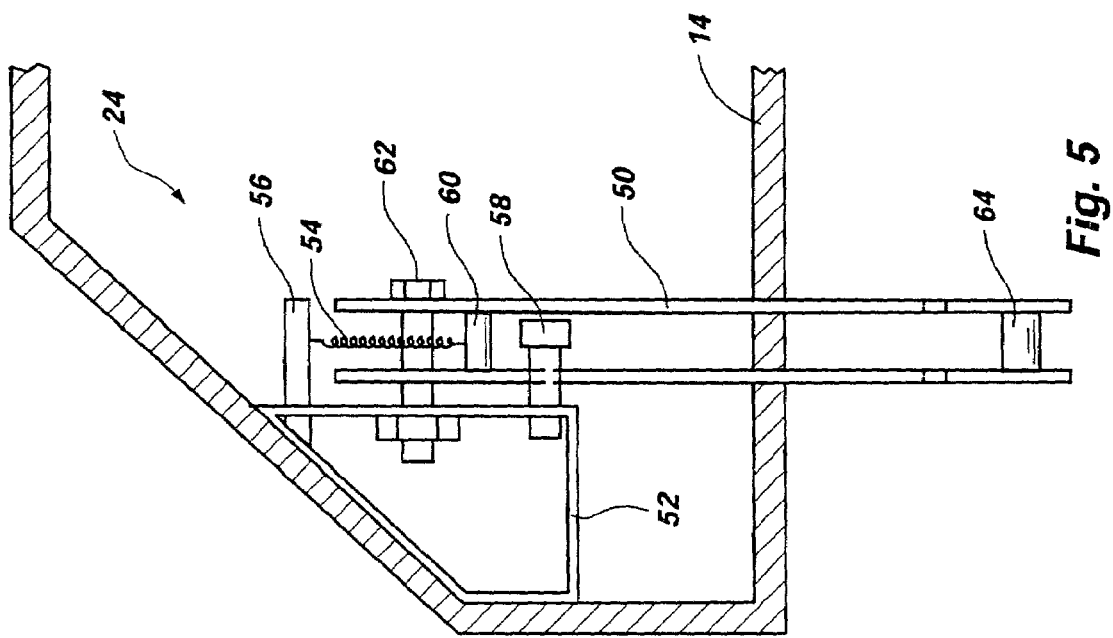
FIG. 5 is a side view, taken along lines 5-5 of FIG. 4, of a lid latching means of the latch illustrated in FIG. 1.

FIG. 4 and FIG. 5, taken along lines 5-5 of FIG. 4, show a preferred embodiment of lid latch 24 according to the present invention. Lid latch 24 adjustably attaches to lid 14 as shown. Lid latch 24 is a unique feature of the present invention because of its ability to engage lid actuator 22 and to facilitate closing and securing of lid 14 to base structure 12. Arm 50, which consists essentially of two substantially L-shaped bars, is pivotally connected by a bolt 62 at one end of arm 50 to bracket 52, which is attached to the inside of lid 14. To enable arm 50 to always be in a proper position to engage hook 46, a spring 54 is attached to arm 50 and bracket 52. Spring 54 is tensioned such that it pulls arm 50 in a pivoting direction causing it to rest against a stopper 58. Stopper 58 is coupled to bracket 52, but is slidably coupled in a slotted aperture 57 wherein stopper 58 may be adjusted. Adjusting stopper 58 subsequently adjusts the biased position of arm 50 as it is pulled by spring 54. By doing so, arm 50 is always in the same position ready to be engaged with hook 46. One end of spring 54 attaches to arm 50 via a lower spring support 60 attached to arm 50 a substantial distance away from the pivot point, bolt 62, of arm 50 such that a moment is created about the pivot point of arm 50 causing arm 50 to rotate or pivot until stopped by stopper 50. The other end of spring 54 attaches to an upper spring support 56 which is attached to bracket 52. Spring 54 ensures proper orientation of arm 50 for engaging hook 46 of lid actuator 22. It will be appreciated by one skilled in the art that several embodiments exist which could perform the identical function as the preferred embodiment of the lid latch 24 described herein. For example, arm 50 could be a curved member or a straight member. The critical feature of arm 50 is that it latches lid actuator 22 and is allowed to pivot as it tracks along cam 47.

FIGS. 6-9 show the operation interaction and the relative positions of the lid latch 24 with respect to the lid actuator 22 as the lid actuator 22 is rotated through its several positions. In connection with lid actuator 22, latching member 64 of lid latch 24 engages hook 46 of hooking cam 45. As lid actuator 22 is rotated, latching member 64 on arm 50 of lid latch 24 tracks along cam 47, thus pulling lid 14 down. Upon full or complete rotation of lid actuator 22, lid 14 comes to rest within notch 49. Notch 49 is integrally formed within cam 47 and serves to receive and secure latching member 64 when lid 14 is in a closed and locked position. Notch 49 prevents lid 14 from inadvertently opening when subjected to vibration or bouncing. This is significant because, under varying driving conditions, lid 14 may have a tendency to open. Notch 49 prevents this and ensures lid 14 stays in its secured and locked position.

In conventional vehicle storage box's, the user must hold down lid 14 in its completely closed position while operating the locking mechanism used to secure lid 14 to the main base structure 12. The present invention eliminates this problem by providing a storage box 10 that has a lid coupler 23 that can be operated when lid 14 is in a partially opened position. The user need not hold down lid 14 completely to activate the locking mechanism.

Figure 6:
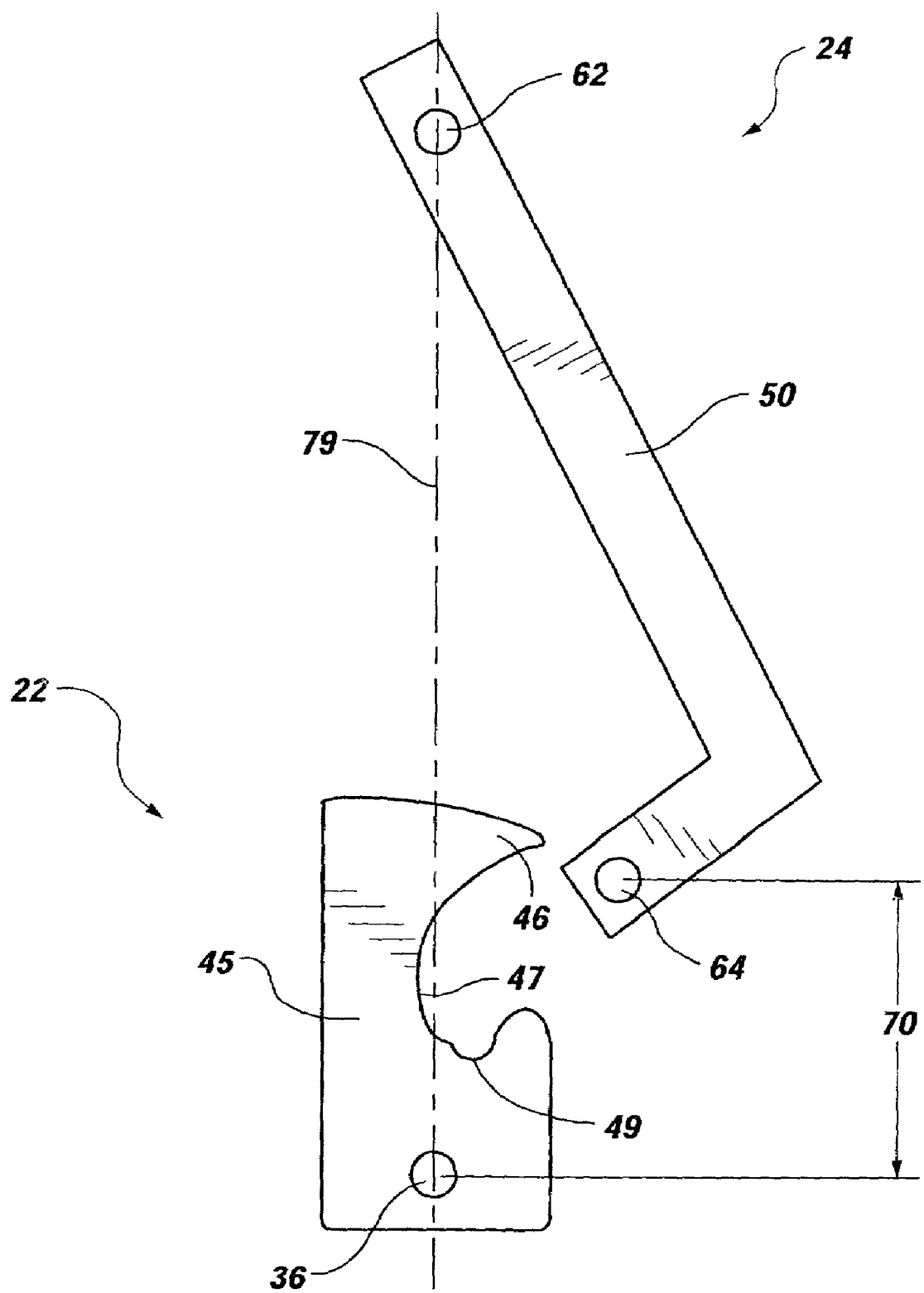
FIG. 6 depicts the anticipated engagement and relative position of a lid actuator means and a lid latching means or latch illustrated in FIG. 1.

FIG. 6 shows a preferred embodiment of lid coupler 23 just prior to engagement. As lid 14 is lowered, arm 50 comes within the region where hooking cam 45 on lid actuator 22 is able to engage latching member 64 upon rotation of lid actuator 22. Distance 70 represents the distance between latching member 64 and the axis of rotation 36 of hooking cam 45.

Figure 7:
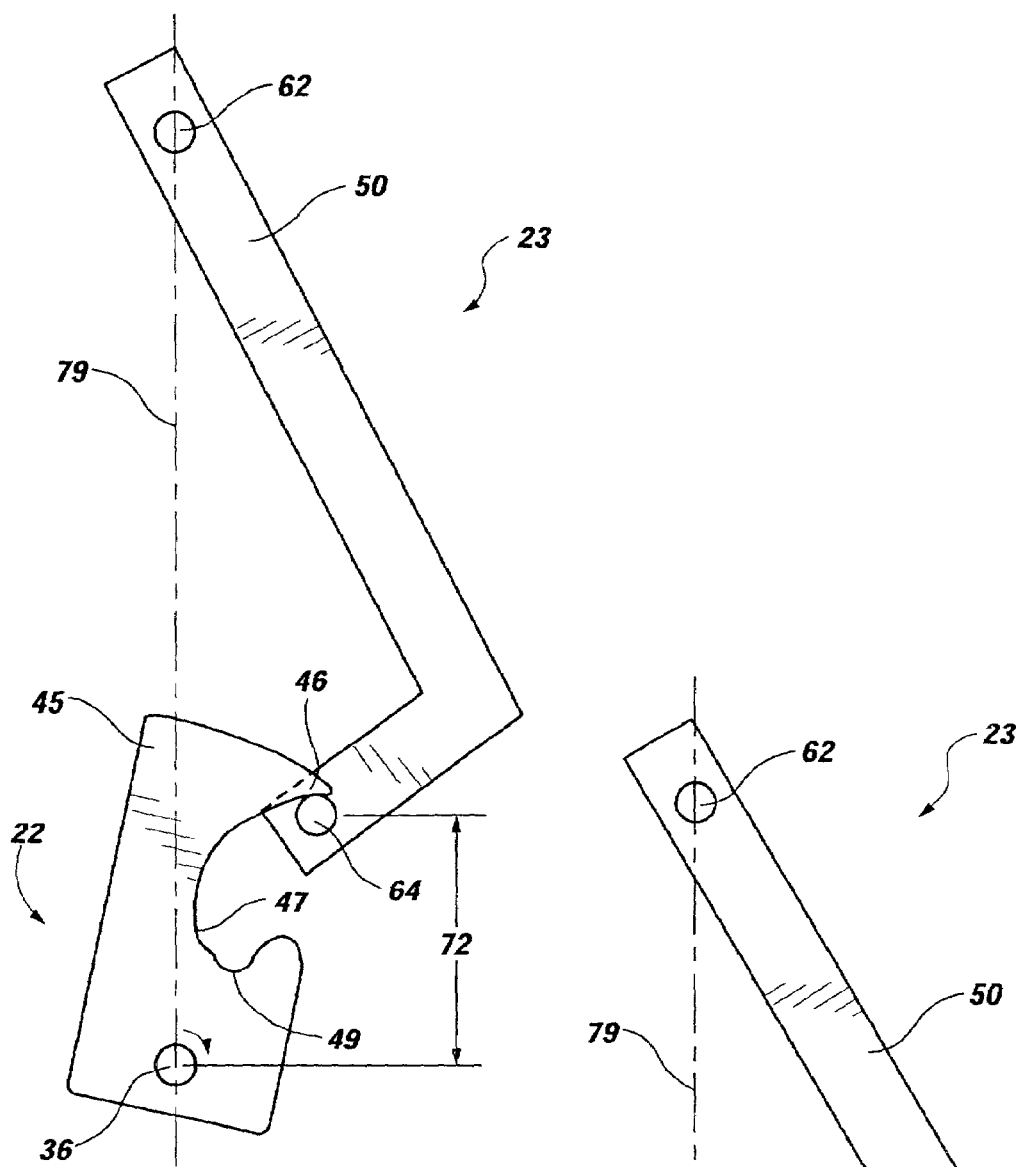
FIG. 7 depicts the initial point of contact or engagement and relative position of a lid actuator means and a lid latching means or latch illustrated in FIG. 1.

FIG. 7 shows the lid coupler 23 at the initial or first coupling position. Lid 14 is lowered and hooking cam 45 is slightly rotated about axis 36 such that hook 46 is able to engage and hook latching member 64. This represents the first coupling position of lid coupler 23. Upon hooking latching member 64, latching member 64 is instantly placed within the cam 47. At this first coupling position, the user is no longer required to hold lid 14 down. The lid coupler 23 allows the user, if desired, to bring lid 14 to the first coupling position as described above and then let go of lid 14. Lid 14 is now held down by lid coupler 23, ready to be closed without further assistance of the user. To close the lid, lid actuator 22 is rotated completely, which will cause latching member 64 to track along cam 47 and pull lid 14 down until latching member comes to rest in notch 49. At this point, lid 14 is in its secured and locked position. Distance 72 represents the distance between latching member 64 and the axis of rotation 36 at the first coupled position.

Figure 8:
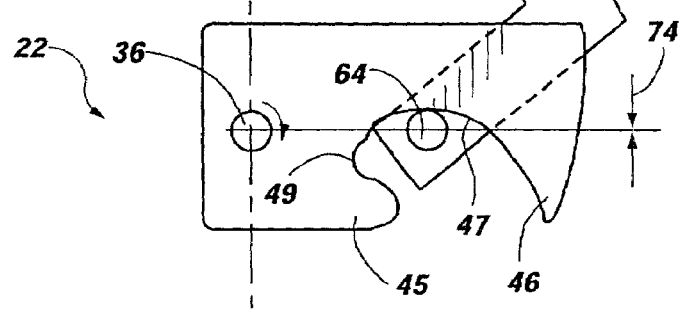
FIG. 8 depicts an interim point of travel and relative position of a lid actuator means and a lid latching means or latch illustrated in FIG. 1.

FIG. 8 shows lid coupler 23 at a coupled position half-way through full rotation. Latching member 64 has tracked a distance along cam 47. Also, lid 14 has been pulled down a distance equal to the distance 72 in FIG. 7. Distance 74 represents that there is substantially no distance between latching member 64 and the axis of rotation 36 half-way through rotation. Lid 14 is pulled down and travels a distance 72 by rotating lid actuator 22 about halfway around.

Figure 9:
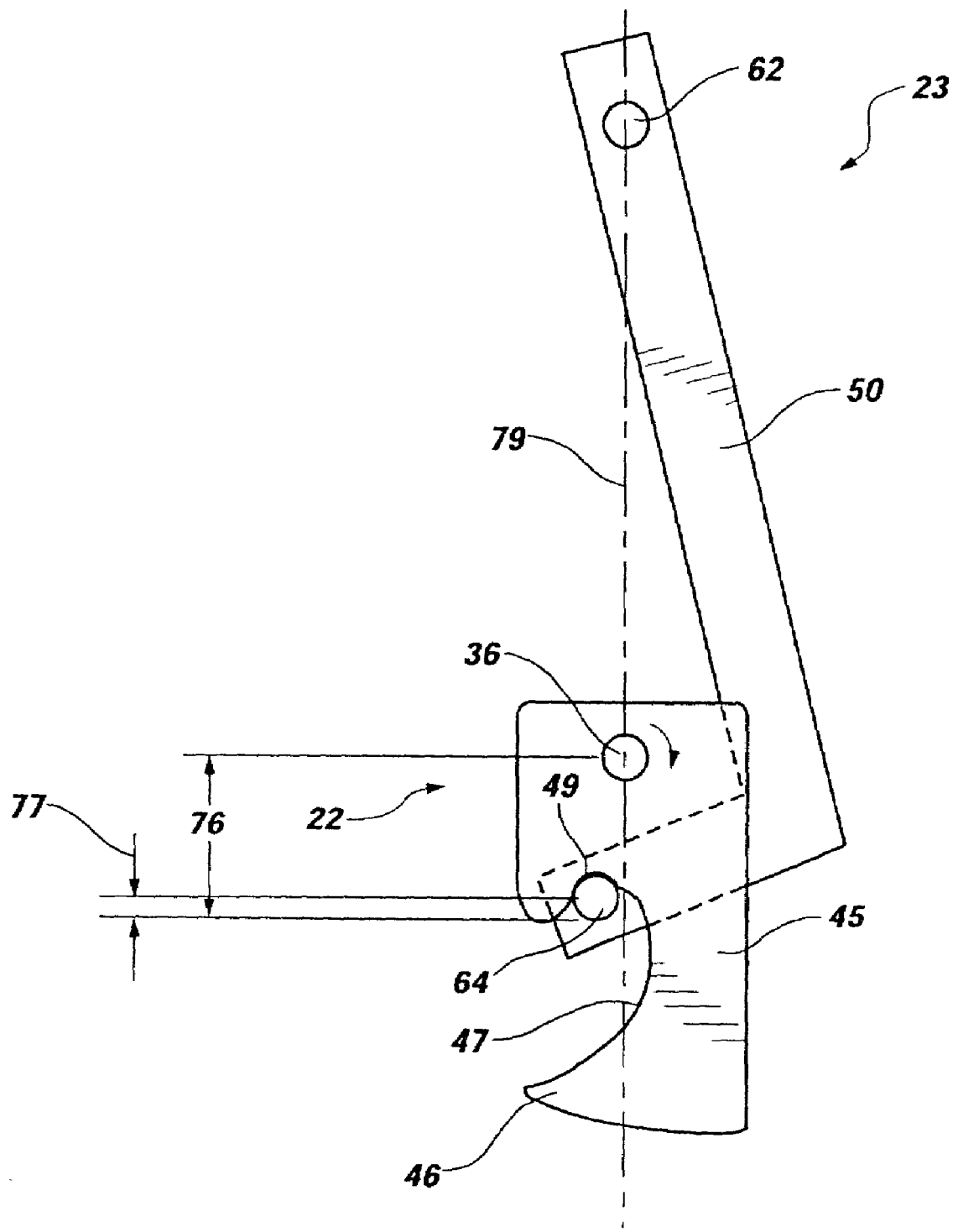
FIG. 9 depicts the final, locked, and relative position of a lid actuator means and a lid latching means or latch illustrated in FIG. 1.

FIG. 9 represents lid coupler 23 at a fully rotated coupled position. This position represents lid 14 in its fully closed and secured position to base structure 12. As shown by FIG. 9, latching member 64 has completely tracked cam 47 and is resting within notch 49. Arm 50 has slightly rotated about axis 62 as latching member 64 has tracked cam 47. Distance 76 represents the distance between latching member 64 and the axis of rotation 36 for the last portion of rotating lid actuator's 22 rotation. Distance 77 represents the distance traveled by latch member 64 after it has traversed center line 79. As shown by these several figures, lid 14 travels a combined distance equal to distance 72, plus distance 76, minus distance 77, as lid actuator 22 is rotated from a first coupling position to a final coupling position where lid 14 is closed and secured to base structure 12. Because of the cam action of cam 47, as lid actuator 22 is rotated, lid 14 travels the farthest between the first coupling position and the half-way point of rotation illustrated in FIG. 8. From the half-way point of rotation to the final complete point of rotation of lid actuator 22, lid 14 travels a lesser relative distance. As appreciated by one skilled in the art, a combination of the forces between lid actuator 22, lid latch 24, and the cam action of cam 47, a rollover effect is achieved as lid actuator 22 is rotated from the half-way point to the point of complete rotation when lid actuator is resting within notch 49. As latching member 64 is tracking along cam 47 during the final positions of rotation, latching member 64 rolls over into a resting position within notch 49 once latching member 64 crosses or traverses center line 79. This rollover effect facilitates a secure fit of lid 14 to base structure 12 and aids in the closing of lid 14. Also, throughout complete rotation of lid actuator 22, pivot points, 36 and 62 are always in-line. Thus, eliminating any detrimental moment force between the two pivot points 36 and 62.

Figure 10:
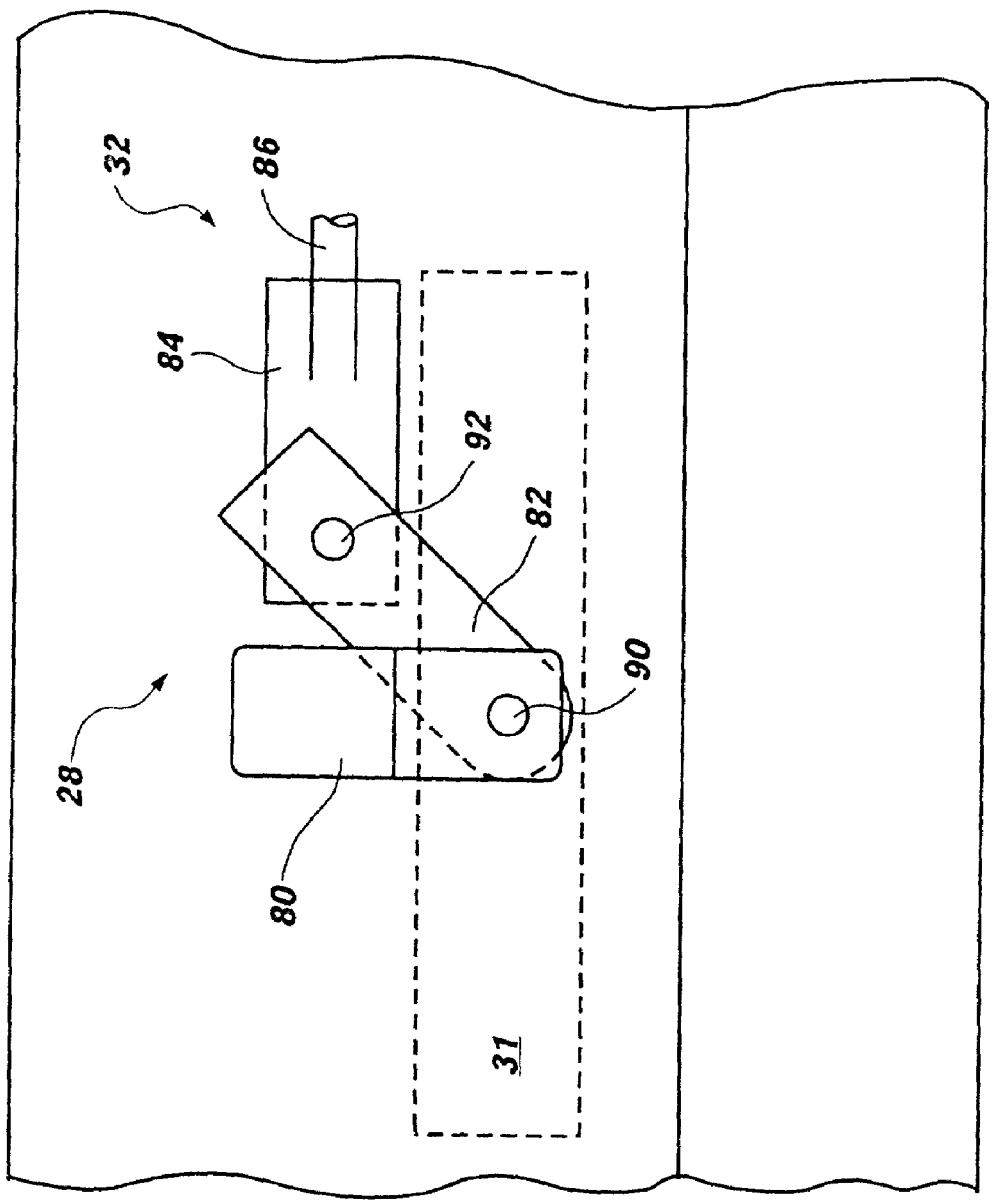
FIG. 10 is a front view of a divider actuator means illustrated in FIG. 1.

Referring now to FIG. 10, divider coupler 27 comprises a divider actuator 28 and a divider latch 26. In a preferred embodiment, divider actuator 28 comprises a latching member 80 pivotally coupled to lid 14 at pivot point 90. Latching member 80 couples or latches to divider latch 26 shown in FIG. 1. Coupling divider latch 26 to latching member 80, divider 16 is secured to lid 14. Divider 16, when secured to lid 14, forms a second compartment of vehicle storage box 10.

Divider actuator 28 also functions similarly to lid actuator 22 in that operation of one simultaneously controls operation of the other. In a preferred embodiment, a first and second divider coupler 27 includes a first and second divider actuator 28 coupled to lid 14. First and second divider actuators 28 are connected to each other by a divider actuator connector 32 which allows the simultaneous operation of first and second divider actuators 28. As shown in FIGS. 1 and 10, divider actuator 28 is pivotally coupled to lid 14 and also to divider actuator connector 32. Divider actuator connector 32 comprises an angled linking member 82, a linking member 84, and a rod 86. Angled linking member 82 is pivotally coupled to latching member 80 at one end and pivotally coupled to linking member 84 at the other end. Linking member 84 is pivotally coupled to angled linking member 82 at one end and attached to rod 86 at the other end. Rod 86 links the first and second divider actuator 28 together such that a user can operate, simultaneously, the first and second divider coupler from either side of the vehicle.

Figure 11:
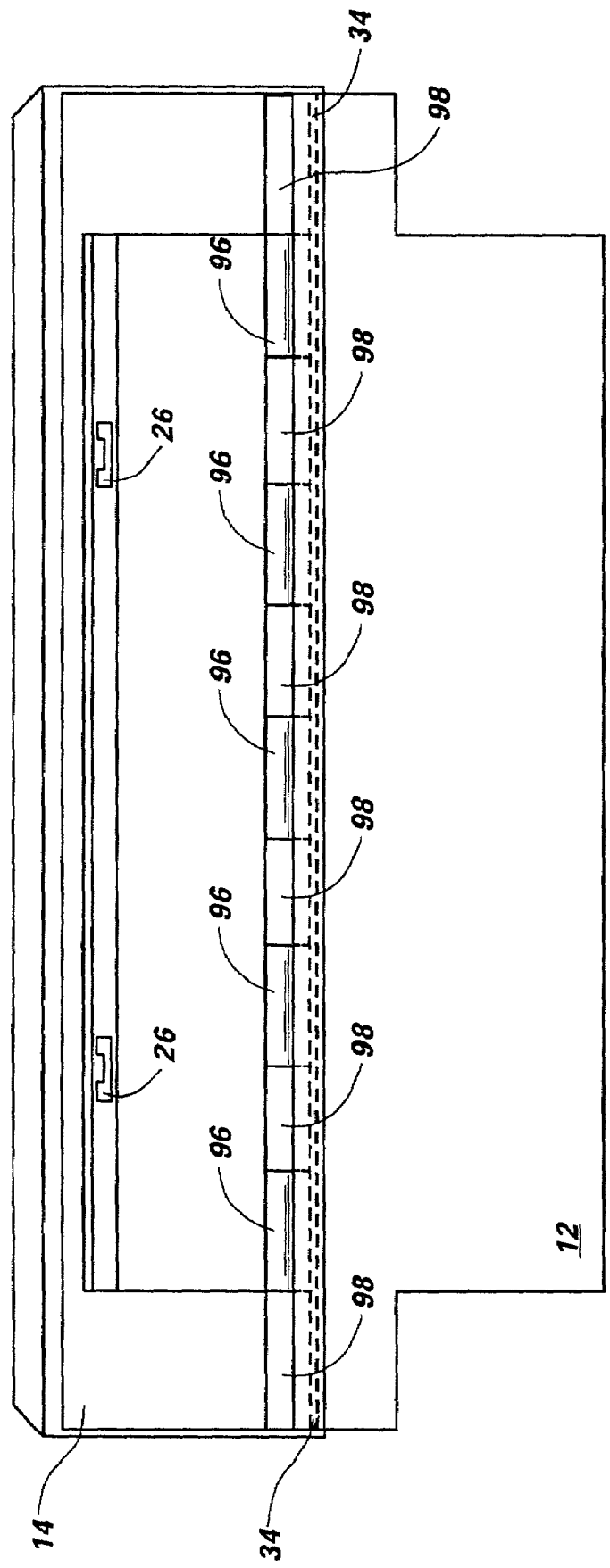
FIG. 11 is a front view of a vehicle storage box having single hinged dual compartments illustrated in FIG. 1.
Figure 12:
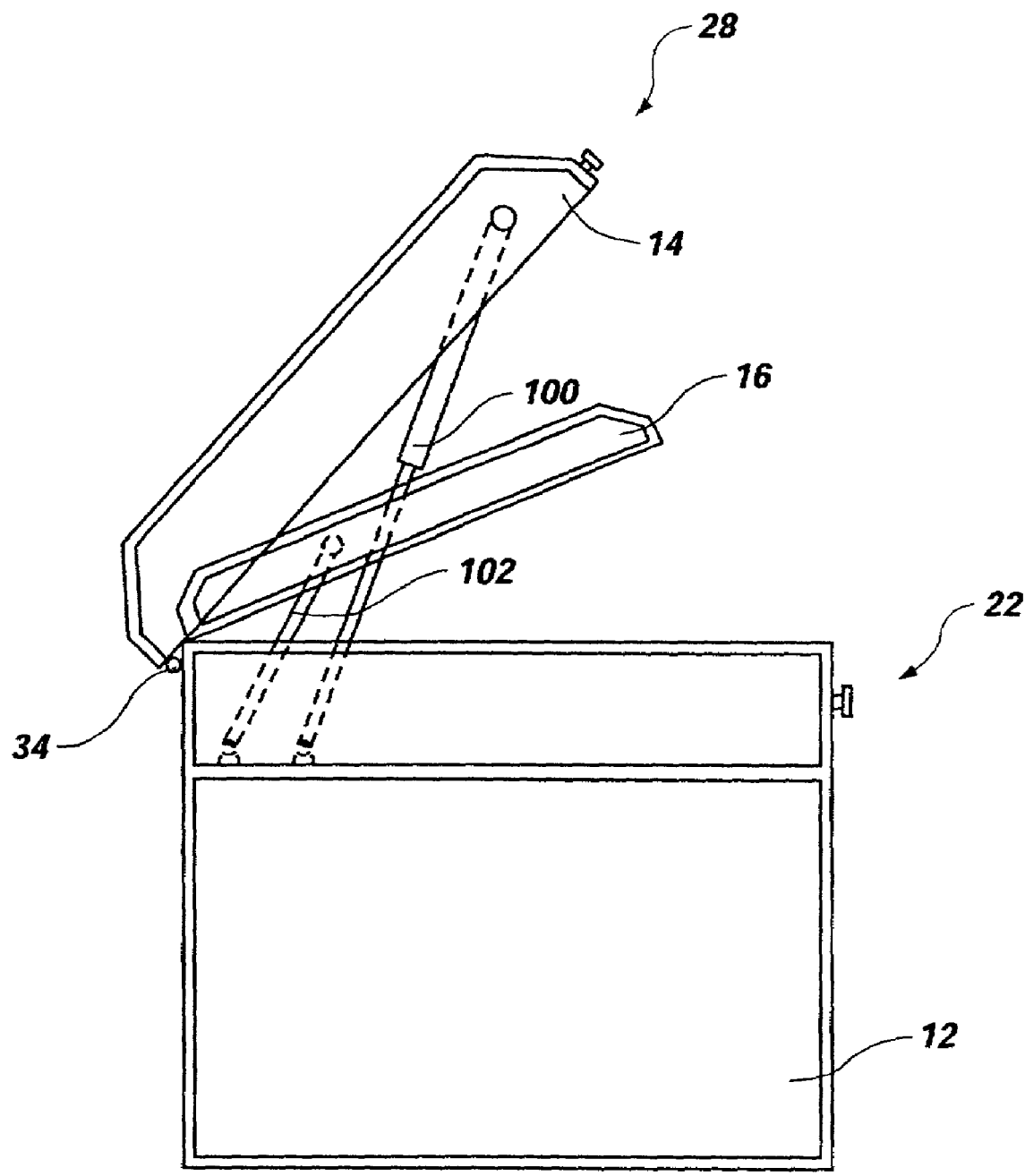
FIG. 12 is a side view of a vehicle storage box having single hinged dual compartments illustrated in FIG. 1.

As shown in FIGS. 11 and 12, divider 16 and lid 14 pivot about the same axis of rotation. This is accomplished using a single hinge 34. In a preferred embodiment, a modified standard piano type hinge is used having segregated sections for separate attachment of lid 14 and divider 16. Hinge 34 has one side completely coupled to base structure 12, while the other side is alternately coupled to divider 16 and to lid 14 by independent sections 96, which are attached to divider 16, and sections 98, which are attached to lid 14. By doing this, lid 14 and divider 16 can pivot independent of one another or simultaneously.

Lid 14 also includes a lid plunger 100 of those well known in the art. Lid plunger 100 facilitates opening of lid 14 and supplies the necessary forces to keep lid 14 in an opened position unaided by the user.

Divider 16 includes a similar plunger, divider plunger 102, which is smaller in size than lid plunger 100 and that performs a similar function as lid plunger 100 except it acts upon divider 16. Divider plunger 102 is coupled to base support 12 and divider 16 and provides less relative force to divider 16 than does lid plunger 100 to lid 14. Divider plunger 102 will not support divider 16 in an opened position, but is of sufficient strength such that it allows divider 16 to slowly descend upon base support 12. Divider plunger 102 will prevent divider 16 from crashing down upon base support 12. By providing a plunger with insufficient strength to support divider 16 in an upright position, a user may open lid 14 from a closed position, thereby accessing top compartment 18, without lifting divider 16 as well.

As such, it will be obvious to those skilled in the art that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle storage box, comprising:
   a) a base structure;
   b) a lid, pivotally connected to the base structure, shaped to enclose the base structure; and
   c) a lid coupler comprising a first and second adjustable lid actuator and a first and second adjustable lid latch, connected to the lid and the base structure, shaped to releasably couple the lid to the base structure, the lid coupler having a first coupling position occurring when the lid is in an opened position;
   d) the lid actuator including a hooking cain to engage the lid latch while the lid is in an opened position such that, as the lid actuator is rotated, the lid latch tracks along the hooking cam of the lid actuator while the lid is pulled down; and
   e) the first and second lid actuators being coupled together by a cable and pulley system wherein a pulley is coupled to each of the lid actuators and connected by a cable for simultaneous operation of the first and second lid actuators.

2. The storage box of claim 1, wherein the base structure is configured to attach to a vehicle, and has a length sized to fit between side walls of a truck bed.

3. The storage box of claim 1, wherein the lid actuator rotates substantially 180 degrees such that the lid latch is forced through cam action motion.

4. The storage box of claim 1, wherein the hooking cam comprises a hook, a cam, and a notch, wherein the notch is shaped and positioned to receive and retain the lid actuator when the lid is in a closed and secured position.

5. The vehicle storage box of claim 1, wherein the first and second lid latches are substantially L-shaped members having a latching point for engaging respectively the first and second lid actuators.

6. A storage box for use with vehicles comprising:
   a) a base structure;
   b) a lid, pivotally connected to the base structure, shaped to enclose a portion of the base structure; and
   c) lid coupling means, connected to the lid and the base structure, for releasably coupling the lid to the base structure, and having a first coupling position occurring when the lid is in an opened position; and
   d) the lid coupling means including a lid latch coupled to the lid, and means, rotatably coupled to the base structure, for engaging and latching the lid latch while in the first coupling position; and
   e) the means for engaging and latching the lid latch including a hooking cam for facilitating closing and securing the lid to the base structure, the hooking cam on a lid actuator engages the lid latch while the lid is in an opened position such that, as the lid actuator is rotated, the lid latch tracks along the hooking cam of the lid actuator wherein the lid is pulled down, the lid being securely closed upon complete travel of the lid latch along the hooking cam; wherein the lid actuator rotates substantially 180 degrees along the hooking cam such that the lid latch is forced through cam action motion.

7. The storage box of claim 6, wherein the base structure is configured to attach to a vehicle, and has a length sized to fit between side walls of a truck bed.

8. The storage box of claim 6, wherein the hooking cam comprises a hook, a cam, and a notch, wherein the notch is shaped and positioned to receive and retain the lid actuator when the lid is in a closed and secured position.

9. The storage box of claim 6, wherein the lid coupling means comprises a first and second adjustable lid actuator and a first and second adjustable lid latch.

10. The storage box of claim 9, wherein the first and second lid actuators are coupled together by a lid actuator connector for simultaneous operation of the first and second lid actuators.

11. The storage box of claim 9, wherein the first and second lid latches are substantially L-shaped members having a latching point for engaging respectively the first and second lid actuators.

12. The storage box of claim 10, wherein the lid actuator connector comprises a cable and pulley system wherein a pulley is coupled to each of the lid actuators and connected by a cable.

13. A vehicle storage box, comprising:
   a) a base structure;
   b) a lid, pivotally connected to the base structure, shaped to enclose the base structure; and
   c) a lid coupler, connected to the lid and the base structure, shaped to releasably couple the lid to the base structure, the lid coupler having a first coupling position occurring when the lid is in an opened position, the lid coupler including an adjustable lid actuator and an adjustable lid latch, each rotatable in a common plane substantially parallel to a front of the base structure.

14. The storage box of claim 13, wherein the base structure is configured to attach to a vehicle, and has a length sized to fit between side walls of a truck bed.

15. The storage box of claim 13, wherein
   a) the lid coupler includes a lid latch and a lid actuator, and b) the lid actuator including a hooking cam to engage the lid latch while the lid is in an opened position such that, as the lid actuator is rotated, the lid latch tracks along the hooking cam of the lid actuator while the lid is pulled down.

16. The storage box of claim 13, wherein
a) the lid coupler includes: 1) a lid latch coupled to the lid, and 2) a lid actuator, rotatably coupled to the base structure, to engage and latch the lid latch while in the first coupling position; and
b) the lid actuator including a hooking cam to facilitate closing and securing the lid to the base structure, the hooking cam on the lid actuator engaging the lid latch while the lid is in an opened position such that, as the lid actuator is rotated, the lid latch tracks along the hooking cam of the lid actuator wherein the lid is pulled down, the lid being securely closed upon complete travel of the lid latch along the hooking cam, the lid actuator rotating substantially 180 degrees such that the lid latch is forced through cam action motion.

17. The vehicle storage box of claim 13, wherein the lid coupler comprises a first and second adjustable lid actuator and a first and second adjustable lid latch.

18. The storage box of claim 15, wherein the lid actuator rotates substantially 180 degrees such that the lid latch is forced through cam action motion.

19. The storage box of claim 16, wherein the hooking cam comprises a hook, a cam, and a notch, wherein the notch is shaped and positioned to receive and retain the lid actuator when the lid is in a closed and secured position.

20. The vehicle storage box of claim 17, wherein the first and second lid actuators are coupled together by a lid actuator connector for simultaneous operation of the first and second lid actuators.

21. The vehicle storage box of claim 20, wherein the lid actuator connector comprises a cable and pulley system wherein a pulley is coupled to each of the lid actuators and connected by a cable.

22. The vehicle storage box of claim 20, wherein the first and second lid latches are substantially L-shaped members having a latching point for engaging respectively the first and second lid actuators.

23. A vehicle storage box, comprising:

a base structure;

a lid, pivotally connected to the base structure; and a lid coupler configured to releasably couple the lid to the base structure, the lid coupler having a first coupling position in which the lid coupler engages the lid when the lid is in an opened position.

* * * * *